US009191959B2

(12) United States Patent
Bindel et al.

(10) Patent No.: US 9,191,959 B2
(45) Date of Patent: Nov. 17, 2015

(54) ADMINISTRATOR FOR AUTOMATICALLY ADAPTING A TRANSMISSION CHANNEL

(75) Inventors: Frank Bindel, Koenigswinter (DE); Ludwig Brackmann, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1067 days.

(21) Appl. No.: 10/542,102

(22) PCT Filed: Feb. 4, 2004

(86) PCT No.: PCT/DE2004/000179
§ 371 (c)(1),
(2), (4) Date: Apr. 11, 2006

(87) PCT Pub. No.: WO2004/073258
PCT Pub. Date: Aug. 26, 2004

(65) Prior Publication Data
US 2006/0229069 A1    Oct. 12, 2006

(30) Foreign Application Priority Data

Feb. 17, 2003 (DE) .................................. 103 06 453

(51) Int. Cl.
*H04W 72/04* (2009.01)
*H04W 76/02* (2009.01)

(52) U.S. Cl.
CPC ............ *H04W 72/048* (2013.01); *H04W 76/02* (2013.01)

(58) Field of Classification Search
CPC ............................. H04W 72/048; H04W 76/02
USPC ................. 455/445, 421, 422, 414, 450–453, 455/422.1–425
See application file for complete search history.

(56) References Cited

U.S. PATENT DOCUMENTS

| 5,448,570 | A  | * | 9/1995  | Toda et al. ...................... 370/337 |
| 5,457,680 | A  | * | 10/1995 | Kamm et al. ................... 370/332 |
| 6,026,297 | A  | * | 2/2000  | Haartsen ..................... 455/426.1 |
| 6,157,834 | A  | * | 12/2000 | Helm et al. .................... 455/436 |
| 6,161,139 | A  | * | 12/2000 | Win et al. ....................... 709/225 |
| 6,201,962 | B1 | * | 3/2001  | Sturniolo et al. ........... 455/432.2 |
| 6,233,577 | B1 | * | 5/2001  | Ramasubramani et al. ...... 707/9 |
| 6,292,657 | B1 | * | 9/2001  | Laursen et al. ............... 455/411 |
| 6,301,471 | B1 | * | 10/2001 | Dahm et al. ................... 455/405 |
| 6,452,910 | B1 | * | 9/2002  | Vij et al. ......................... 370/310 |
| 6,594,484 | B1 | * | 7/2003  | Hitchings, Jr. ............. 455/414.1 |
| 6,675,015 | B1 | * | 1/2004  | Martini et al. ................ 455/436 |
| 6,731,939 | B1 | * | 5/2004  | Watanabe et al. ............. 455/450 |
| 6,744,753 | B2 | * | 6/2004  | Heinonen et al. ............. 370/338 |
| 6,754,250 | B2 | * | 6/2004  | Haartsen ........................ 375/132 |
| 6,772,331 | B1 | * | 8/2004  | Hind et al. ..................... 713/151 |
| 6,795,857 | B1 | * | 9/2004  | Leung et al. .................. 709/224 |
| 6,816,510 | B1 | * | 11/2004 | Banerjee ....................... 370/503 |
| 6,834,192 | B1 | * | 12/2004 | Watanabe et al. ............. 455/444 |
| 6,842,400 | B2 | * | 1/2005  | Blanch et al. .................. 367/30 |

(Continued)

*Primary Examiner* — Sharad Rampuria
(74) *Attorney, Agent, or Firm* — Kenyon & Kenyon LLP

(57) ABSTRACT

A method and system for exchanging data using a wireless connection according to which a user with one or more portable terminals is located in the transmission and receiving area of at least one network and the terminal or terminals log on automatically to the network in order to establish a connection. A transmission channel for the data exchange is made available for the respective connection that has been established. The transmission channel is automatically adapted for the data exchange to the type of terminal and the type, for example, quantity, of data to be transmitted, by an administrator that is allocated to the network.

21 Claims, 1 Drawing Sheet

(56) References Cited

U.S. PATENT DOCUMENTS

| | | | |
|---|---|---|---|
| 6,909,705 B1* | 6/2005 | Lee et al. | 370/338 |
| 7,079,499 B1* | 7/2006 | Akhtar et al. | 370/310 |
| 7,218,644 B1* | 5/2007 | Heinonen et al. | 370/468 |
| 7,565,529 B2* | 7/2009 | Beck et al. | 713/156 |
| 7,587,512 B2* | 9/2009 | Ta et al. | 709/233 |
| 2002/0035699 A1 | 3/2002 | Crosbie | |
| 2002/0054578 A1 | 5/2002 | Zhang et al. | |
| 2002/0056008 A1* | 5/2002 | Keane et al. | 709/245 |
| 2002/0112027 A1* | 8/2002 | McHugh et al. | 709/218 |
| 2003/0153338 A1* | 8/2003 | Herz et al. | 455/517 |
| 2008/0144501 A1* | 6/2008 | Nagy et al. | 370/235 |
| 2008/0311851 A1* | 12/2008 | Hansen et al. | 455/41.2 |
| 2011/0292876 A1* | 12/2011 | Morris | 370/328 |
| 2014/0293829 A1* | 10/2014 | Visuri et al. | 370/254 |

* cited by examiner

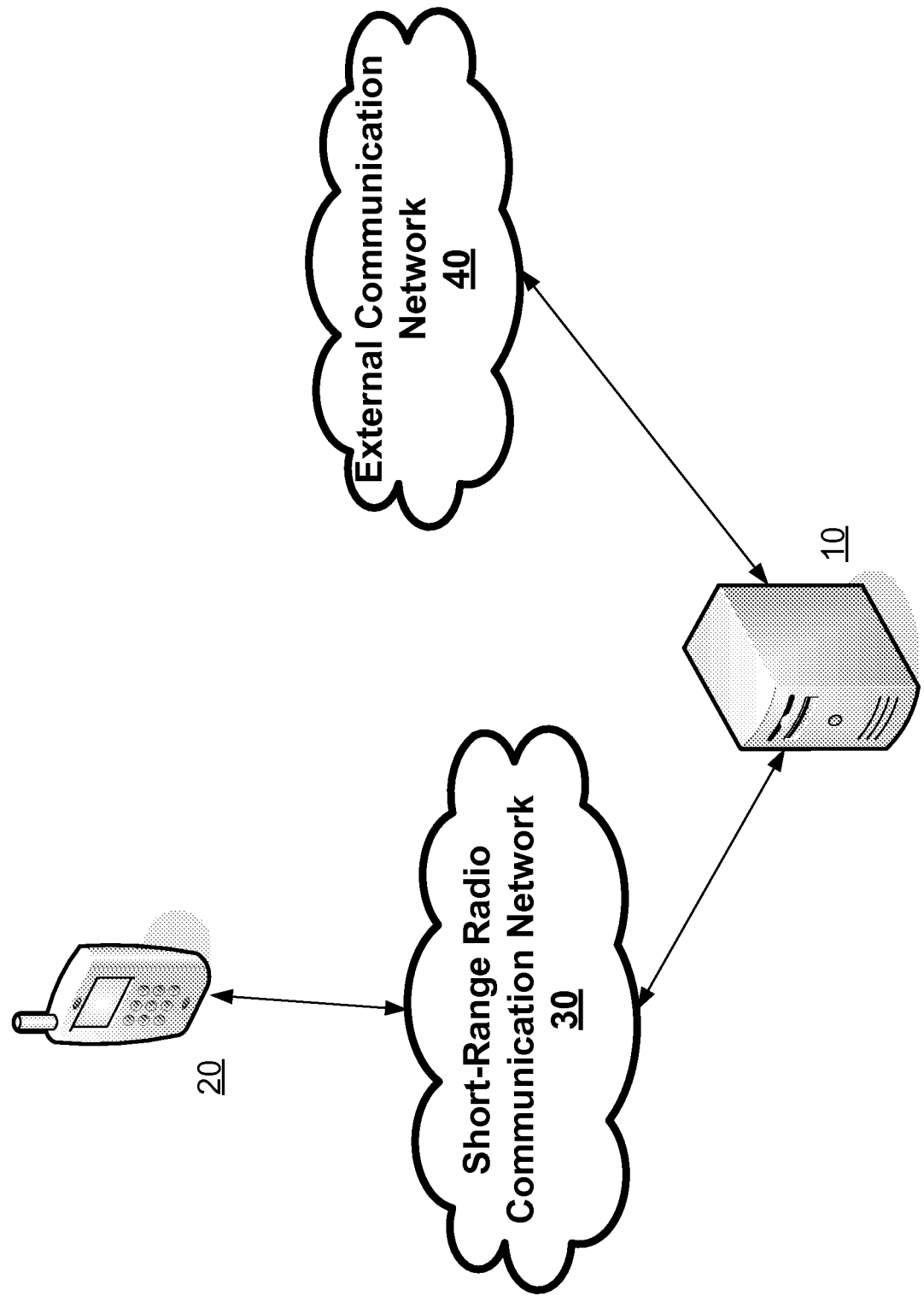

ADMINISTRATOR FOR AUTOMATICALLY ADAPTING A TRANSMISSION CHANNEL

FIELD OF THE INVENTION

The present invention relates to a method and system for exchanging data using a wireless connection. Further, the present invention relates to a method and system in which a user has one or more portable terminals located in the transmission and reception range of at least one network, the terminal or terminals automatically logging on to the network in order to establish a connection, and a transmission channel being made available for the data exchange within the framework of the connection established in each case.

RELATED TECHNOLOGY

Depending on a user's exact whereabouts, more or fewer possibilities are available to him for exchanging data via wireless connections. More often than not, the user is in the service area of the Global System for Mobile Communications (GSM) networks for mobile telephony, while short-range radio communications networks such as Bluetooth or Wireless Local-Area Network (WLAN) may be only available to the user on certain occasions.

The exchange of large volumes of data is generally associated with different expenditure in terms of transmission time and cost, depending upon the type of connection usable at the moment. For this reason, the user has an interest in waiting with the download of an MP3 data file, for example, until he gets into the Internet via a faster mode, e.g., WLAN. The user will not want to retrieve the data file via GSM. Thus, the user will wait until the terminals the user is carrying get into the service area of a distributor or access point which provides the terminals with access to external networks via a local network. So-called "cafe computing" is an example of such local networks. In such a situation, a user goes into a cafe, for instance, opens his laptop, logs wirelessly (e.g., Bluetooth) onto the local network of the cafe via an access point, and answers E-mails or surfs the Internet while enjoying a cappuccino. Located next to the user can be a cellular phone, with which the user telephones via GSM, or exchanges short messaging service (SMS) messages.

When working with such devices, a maximum bandwidth is reserved for each unit logged onto the cafe access point, even if the user needs only a little capacity at the moment. Consequently, resources often are wasted unnecessarily for relatively modest requirements. From the cafe operator's point of view, this can be unsatisfactory since resources which he could profitably offer to other users are being blocked.

BRIEF DESCRIPTION OF THE DRAWINGS

FIG. 1 shows an example embodiment according to the present invention.

DETAILED DESCRIPTION

Exemplary embodiments of the present invention provide a method for data exchange within the framework of such concepts described above, which may easily be implemented by cost-effective means, and which automatically ensures efficient distribution of the available resources, accompanied by great ease of operation, and which therefore can contribute to an increase of acceptance.

Exemplary embodiments involve the recording of the whereabouts of a user and his respective terminals and, depending on the whereabouts, automatically making available to the user the connections that are possible there, and having the capacity needed for the data exchange. Such embodiments involve an adaptation relating to the type of terminal or terminals and the type, for example, the quantity, of data waiting for transmission. Such can be accomplished automatically by the administrator assigned to the network.

Exemplary embodiments of the present invention can be manifested on two levels. Thus, the user, having his terminals, may stay at one location, e.g., in the area of a cafe access point, over the duration of the connection. The result is that the administrator assigned to this "internal" network then makes an optimized connection available to the user. On the other hand, in a superordinate level of the present invention, the movement of the terminals across the boundaries of networks is monitored, and depending on the whereabouts, connections are produced to the networks established there. The user is thus able to move freely, while the system takes care that he is able to accomplish his data transmission, in each case under optimized marginal conditions, for example, with respect to costs, security and/or transmission performance. Among the channels available, one is selected which is suitable for fulfilling the task, this channel being adjustable in its transmission capacity. Thus, the administrator assumes the function of a router which automatically selects the best possible transmission path. In further embodiments, the user can predefine the priorities.

FIG. 1 shows an implementation of the present invention within the framework of a local network, e.g., in a cafe, a permanently installed device can be used as administrator 10, the portable terminal 20 gaining access to an external communication network 40, for example, the Internet or a telephone network, via the administrator 10. In this case, the connection between the terminal 20 and the administrator 10 is established via a short-range radio communication network 30, for example, Bluetooth or WLAN.

In exemplary embodiments of the present invention, the available possibilities and resources are adapted flexibly to the instantaneous requirements. In order to accomplish this, the type of portable terminals to be assigned to a user and the type of data waiting to be transmitted are ascertained. On the basis of the conditions ascertained, one connection is then selected from a plurality of connections available. Ultimately, the connection is established and cleared between the distributor and the portable terminal.

Exemplary embodiments of the present invention also are useful when usage of the local network is possible with different terminals. Thus, it is unnecessary to know what communication device the user entering the cafe is also carrying with him. At the user's whim, the user is able to make use of a personal data assistant (PDA), a laptop or a BlackBerry. According to the present invention, the communication with the terminal is possible via the wireless network of the cafe, without an external provider, accompanied by additionally accruing costs, being needed. The administrator obtains the information, transmitted or detected automatically, as to what devices are available to the user, and selects one of the devices and the type of connection optimized to the data.

As explained, it is useful if the administrator selects the bandwidth (capacity) as a function of the amount of data to be transmitted.

In an exemplary embodiment, the greater the quantity of data waiting, the greater the bandwidth it will select, in order to attain a comfortable transmission rate. In selecting the bandwidth, the administrator will orient itself to how high the overall load is at present, and what total transmission duration at most it may probably expect of the user. In this context, depending on the direction of the data transmission, the need may be ascertained automatically or by a message sent in advance. In the case of transmission to the terminal, by analysis, the administrator is able to learn the type, for example, the extent and the transmission standard, of the data waiting on its side for transmission. For example, if it determines that it is a larger MP3 file, it will make a WLAN connection having higher bandwidth available; while for a small E-mail, a Bluetooth connection with low bandwidth may be preferred.

If the intention is to transmit from the terminal to the administrator, it is useful to first send a brief message about the type of data waiting on the side of the terminal, in a kind of header. Based on this information, the administrator is able to set up an optimal connection. In this context, it can be arranged so that each terminal permits the user to define certain usage profiles in advance. Based on the usage profiles, the device ascertains the bandwidth probably needed, and relays this, for example, via the header, to the administrator. Therefore, each device within the reception radius has made available to it only the bandwidth it is anticipated to need. In an exemplary embodiment, it is possible for the distributor to change between bands in the course of a connection, depending upon the requirement. For example, the subject of the fetched E-mail could be sent via Bluetooth, and the annex via rapid WLAN. The user will not notice the switchover between the connections on his laptop. Such a change also exists when information about the type of data that are following is initially exchanged via a first band, before the data are exchanged via another band adapted to the type.

In exemplary embodiments, profile data, which bring about a prior determination of tasks to be accomplished, are predefined to the system. Consequently, the terminal is able to undertake a specific transmission automatically, as soon as it is located in the reception range of an administrator, and without the user having to repeat this process each time.

This type of "flexible" interface according to the present invention is useful. Thus, by the definition of this interface standard, which permits an adjustment of various profile data of individual devices and users with the administrator, it is possible to optimally organize specific bandwidth requirements, while at the same time, a convenient automation of services is ensured. For the user, the present invention offers a high degree of convenience, since many steps are carried out in automated fashion. For the operator of the local network, who makes a profit at the location where the service is made available, his network can be optimally utilized, thus maximizing earnings.

For example, a user has a laptop and a cellular phone which includes organizer functions. The laptop is used substantially privately. On a suitable Internet page, the user has found software offers of interest and has assembled them for the download. For time reasons, however, the user wants to undertake the actual download only when a certain downstream bandwidth is available to him. The user uses the cellular phone professionally for managing E-mail and appointments. In his user profile, the user has specified to undertake a synchronization with the corporate network as often as possible. To save time, however, the user has only the subject lines of the individual messages transmitted in order to be able to sort out unimportant messages.

If the user now enters a cafe which makes a wireless access point available, his devices perceive this independently. They establish the necessary connection autonomously, taking into account the bandwidths required, and fulfill the tasks set beforehand. While the laptop undertakes the notified download with the greatest possible bandwidth, the cellular phone reserves for itself only a small bandwidth, for example, of the Bluetooth connection, and synchronizes itself automatically with the corporate network. The services therefore follow the user, without him having to reactivate and configure them in each instance.

Exemplary embodiments of the present invention can be implemented using an administrator which has a first interface to an external network, for example, the Internet and/or a telephone network, and a second interface to a local network, via which a short-range radio link, suitable for the data transmission, is able to be established to a terminal present in the transmission and reception range. In further embodiments, the administrator has a router module, realized, for example, by a computer program, which determines the type of data waiting for transmission, and establishes a connection, corresponding to the type, to a terminal. This connection is optimized in light of the terminal available, the costs and/or the transmission speed.

What is claimed is:

1. A method for exchanging data using a wireless connection, comprising:
   providing at least one portable terminal located in a transmission and reception range of at least one network;
   logging on automatically to establish a connection to the at least one network by the at least one portable terminal;
   providing a transmission channel available for the exchanging of data within a framework of the connection established; and
   monitoring a movement of the at least one portable terminal across a boundary of the at least one network,
   wherein for the data exchange, a capacity of the transmission channel is adapted automatically to an amount of the data to be transmitted, by an administrator assigned to the network,
   wherein the type of the at least one portable terminal and the type of data to be transmitted is provided to the administrator from the at least one portable terminal.

2. The method as recited in claim 1, wherein the administrator is a permanently installed terminal, and the at least one portable terminal gains access to the at least one network which is an external communication network via the administrator, and any terminal producing access to the administrator does so via a shortrange radio communication network.

3. The method as recited in claim 1, further comprising:
   adapting automatically a bandwidth of the transmission channel based on at least one of connection costs and handling capacity of the at least one portable terminal.

4. The method as recited in claim 1, further comprising:
   selecting the transmission channel from the plurality of available transmission channels based on at least one of connection costs and handling capacity.

5. The method as recited in claim 1, further comprising:
   transmitting information regarding the type of data from the terminal to the administrator via a header of an email sent in advance.

6. The method as recited in claim 1, wherein the administrator obtains information regarding the type of data and bandwidth needs with aid of analysis of the data waiting for transmission.

7. The method as recited in claim 1, wherein in the course of a connection, a change is automatically carried out between at least one of the transmission channel and other transmission channels, the transmission channel and the bandwidth, the bandwidth and other bandwidths, depending on at least one of the requirements and free resources.

8. The method as recited in claim 1, further comprising:
predefining the user profile in the terminal;
initiating automatically the user profile with a work cycle as soon as the terminal comes in contact with the administrator,
wherein the user profile includes a prioritization of at least one of data type, bandwidth size needed, and type of portable terminal type, so that based on the transmission channel available the administrator effects the prioritization.

9. The method as recited in claim 1, wherein the transmission channel is adapted automatically to a quantity of data to be transmitted.

10. The method as recited in claim 2, wherein the external communication network is one of Internet and a telephone network, and wherein the short-range radio communication network is at least one of Bluetooth and wireless local area network (WLAN).

11. The method of claim 1, wherein the transmission channels are determined for each data to be exchanged to ensure efficient distribution based on bandwidth requirements for the data.

12. The method of claim 1, wherein the data having at least a predetermined size is automatically transmitted when short range radio communications is available.

13. The method of claim 1, wherein the capacity of the transmission channel is further adapted automatically to a type of the at least one portable terminal and a type of data.

14. The method of claim 1, further comprising:
transmitting a first portion of the data over the transmission channel; and
transmitting a second portion of the data over a second transmission channel different from the transmission channel.

15. The method of claim 14, wherein:
the data includes a message, the first portion includes a subject of the message, and the second portion of the data includes a body of the message; and
the transmission channel and the second transmission channel use different communications protocols.

16. The method of claim 14, wherein the transmitting of second portion of the data takes place after the transmitting of a first portion of the data if the capacity of the second transmission channel for the second portion of the data causes data to be exchanged at less than a threshold rate.

17. The method of claim 1, wherein, if the adapted capacity of the transmission channel for the data exchange causes data to be exchanged at less than a threshold rate, the data exchange is delayed until additional capacity becomes available.

18. An administrator comprising:
a first interface to an external network;
a second interface; and
a router module,
wherein, via the first and second interfaces, a radio link suitable for data transmission is producible to a terminal present in a transmission and a reception range, and wherein the router module determines a type of data waiting for transmission and a bandwidth of the connection established being optimized in view of an amount of data to be transmitted over the connection,
wherein the amount of data to be transmitted is provided to the administrator via at least one of a predefined user profile and a message transmitted to the administrator from the at least one portable terminal.

19. The administrator as recited in claim 18, wherein the external network is at least one of Internet and a telephone network.

20. The administrator as recited in claim 19, wherein the radio link is a short-range radio link.

21. An administrator comprising:
a first interface to an external network;
a second interface; and
a router module,
wherein, via the first and second interfaces, a radio link suitable for data transmission is producible to a terminal present in a transmission and a reception range, and wherein the router module determines a type of data waiting for transmission and establishes a connection corresponding to the type of data to the terminal, the connection established being optimized in view of at least one of the terminal, costs, and transmission speed, and wherein the administrator implements a method for exchanging data using a wireless connection, including:
providing a user with at least one portable terminal located in a transmission and reception range of at least one network;
logging on automatically to establish a connection to the at least one network by the at least one portable terminal;
providing a transmission channel available for the exchanging data within a framework of the connection established;
wherein for the data exchange, a capacity of the transmission channel is adapted automatically to an amount of the data to be transmitted, by an administrator assigned to the network,
wherein the type of the at least one portable terminal and the type of data to be transmitted is provided to the administrator via at least one of a predefined user profile and a message transmitted to the administrator from the at least one portable terminal.

* * * * *